(12) United States Patent
Chung et al.

(10) Patent No.: US 12,443,097 B2
(45) Date of Patent: Oct. 14, 2025

(54) PROJECTION LENS MODULE

(71) Applicant: Coretronic Corporation, Hsin-Chu (TW)

(72) Inventors: Wen-Yen Chung, Hsin-Chu (TW); Chun-Ting Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 514 days.

(21) Appl. No.: 18/085,550

(22) Filed: Dec. 20, 2022

(65) Prior Publication Data
US 2023/0194971 A1   Jun. 22, 2023

(30) Foreign Application Priority Data

Dec. 22, 2021   (CN) .......................... 202111576752.9

(51) Int. Cl.
| G03B 21/16 | (2006.01) |
| G03B 21/20 | (2006.01) |
| G03B 21/28 | (2006.01) |

(52) U.S. Cl.
CPC .......... G03B 21/16 (2013.01); G03B 21/2066 (2013.01); G03B 21/28 (2013.01)

(58) Field of Classification Search
CPC ..... G03B 21/16; G03B 21/2066; G03B 21/28
See application file for complete search history.

(56) References Cited

U.S. PATENT DOCUMENTS

| 2007/0147043 A1* | 6/2007 | Lin ......................... G03B 21/16 362/373 |
| 2013/0242270 A1* | 9/2013 | Tsukioka ............... G03B 21/16 353/61 |
| 2014/0055758 A1* | 2/2014 | Tsukioka ............... G03B 21/16 353/58 |
| 2014/0218693 A1* | 8/2014 | Kubo ................... H04N 9/3188 353/57 |

(Continued)

FOREIGN PATENT DOCUMENTS

| CN | 204178110 | 2/2015 |
| CN | 107209446 | 9/2017 |

(Continued)

OTHER PUBLICATIONS

"Office Action of China Counterpart Application", issued on Mar. 21, 2025, p. 1-p. 5.

*Primary Examiner* — Bao-Luan Q Le
(74) *Attorney, Agent, or Firm* — JCIPRNET

(57) ABSTRACT

A projection lens module including a lens assembly, a reflector, a housing, a light shading structure, a fan, and an air guiding element is provided. The reflector is disposed on an optical axis of the lens assembly. The reflector includes a reflective surface and a shady surface. The housing covers the reflector, and includes a first part and a second part. The first part and the reflective surface of the reflector jointly define an enclosed space, and the second part and at least a part of the shady surface of the reflector jointly define an air guiding space. The light shading structure overlaps the air outlet in a direction of the optical axis. The fan is disposed (Continued)

outside the housing. The air guiding element connects the fan and the housing, and guides the wind blown by the fan to the shady surface, and the wind leaves from the air outlet.

10 Claims, 13 Drawing Sheets

(56) References Cited

U.S. PATENT DOCUMENTS

| | | | | |
|---|---|---|---|---|
| 2015/0015851 A1* | 1/2015 | Yamada | ............... | G02B 7/1815 |
| | | | | 353/61 |
| 2017/0068150 A1* | 3/2017 | Nishimori | .............. | G03B 21/16 |
| 2017/0068151 A1* | 3/2017 | Mikawa | ................. | G02B 5/021 |
| 2017/0068152 A1* | 3/2017 | Mikawa | ................. | G03B 21/16 |

FOREIGN PATENT DOCUMENTS

| | | | | | |
|---|---|---|---|---|---|
| CN | 209803546 | | 12/2019 | | |
| CN | 111487838 | | 8/2020 | | |
| CN | 112505995 A | * | 3/2021 | ............. | G03B 21/14 |
| CN | 112987464 A | * | 6/2021 | ............. | G03B 21/16 |
| CN | 113050351 A | * | 6/2021 | ............. | G03B 21/16 |
| CN | 213634086 U | * | 7/2021 | | |
| JP | 2004093655 | | 3/2004 | | |
| JP | 2007206203 | | 8/2007 | | |
| WO | WO-2022014420 A1 | * | 1/2022 | ............. | G03B 21/14 |

* cited by examiner

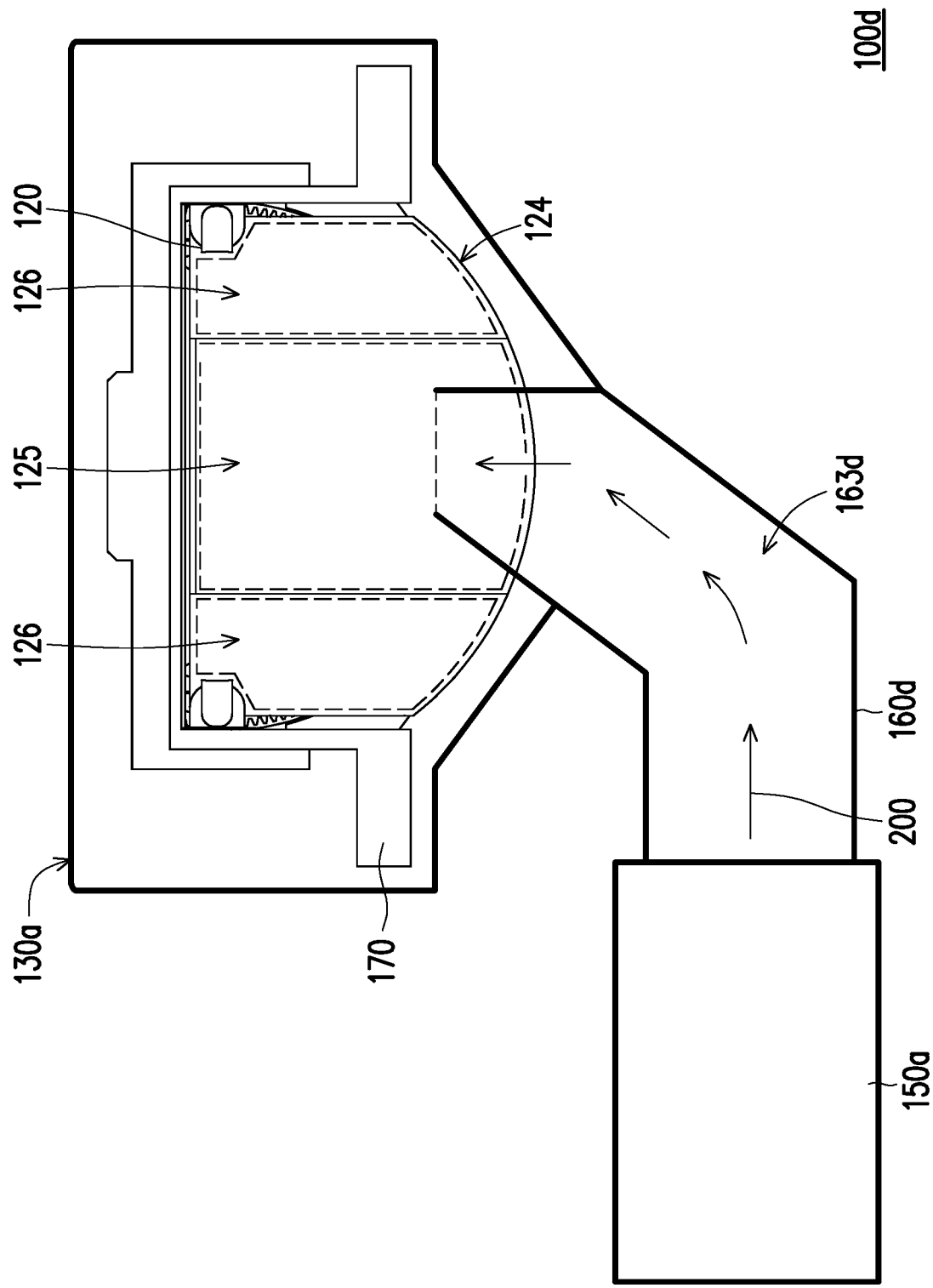

PROJECTION LENS MODULE

CROSS-REFERENCE TO RELATED APPLICATION

This application claims the priority benefit of China application serial no. 202111576752.9, filed on Dec. 22, 2021. The entirety of the above-mentioned patent application is hereby incorporated by reference herein and made a part of this specification.

BACKGROUND

Technical Field

The disclosure relates to a lens module, and particularly relates to a projection lens module.

Description of Related Art

The existing optical projection devices, such as single beam projectors, may project high-quality images. A projection lens of the optical projection device is an important component that affects image quality of the optical projection device.

A light beam of the optical projection device is emitted through the projection lens and projected onto a projection screen, so any defects (for example, dust) in the projection lens will be magnified by the projection lens and affect the image quality. Moreover, the projection lens is used to reflect the light beam with high energy, so that the temperature of the component (for example, a reflector) in the projection lens rises, and the temperatures of different regions of the component vary due to an amount of the incident light beams. As a result, the temperature distribution in different regions of the component is uneven, which affects the image quality of the optical projection device. Therefore, how to prevent the projection lens from affecting the image quality due to dust, uneven temperature distribution of the component, or other defects is an urgent issue to be solved in the art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a projection lens module, in which a first part of a housing and a reflective surface of a reflector form an enclosed space, so that external dust may not fall between a lens assembly and the reflector, and in the projection lens module, a second part of the housing and a shady surface of the reflector form an air guiding space, and wind blown by a fan is introduced into the air guiding space to cool the reflector, so that temperatures on the reflective surface and the shady surface of the reflector are evenly distributed, so as to improve image quality of the projection lens module.

Other objectives and advantages of the disclosure may be further understood from the technical features disclosed herein.

In order to achieve one, a part, or all of the above objectives or other objectives, a projection lens module in the disclosure includes a lens assembly, a reflector, a housing, a light shading structure, a fan, and an air guiding element. The lens assembly has an optical axis. The reflector is disposed on the optical axis of the lens assembly to reflect a light beam transmitted by the lens assembly. The reflector includes a reflective surface and a shady surface opposite to each other. The housing covers the reflector, and includes a first part and a second part. The second part includes an air inlet and an air outlet. The first part and the reflective surface of the reflector jointly define an enclosed space, and the second part and at least a part of the shady surface of the reflector jointly define an air guiding space. The light shading structure extends from the housing and is located besides the air outlet, and the light shading structure overlaps the air outlet in a direction of the optical axis. The fan is disposed outside the housing. The air guiding element is connected to the fan and the air inlet of the housing to guide wind blown by the fan to the at least a part of the shady surface to leave from the air outlet.

Based on the above, in the projection lens module in the disclosure, the enclosed space is formed by the first part of the housing and the reflective surface of the reflector, so as to ensure that there is no dust between the lens assembly and the reflector. In the projection lens module, the air guiding space is formed by the second part of the housing and the shady surface of the reflector, and the wind blown by the fan is introduced into the air guiding space to cool the reflector, so that the temperature of the reflector is evenly distributed. In addition, the projection lens module uses the light shading structure to ensure that leaked light of the reflector does not leak through the air outlet of the second part. Therefore, the projection lens module in the disclosure has functions of dustproof, heat dissipation and light leakage prevention, which improves the image quality of the projection lens module.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4B is a schematic rear view of the projection lens module of FIG. 4A.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
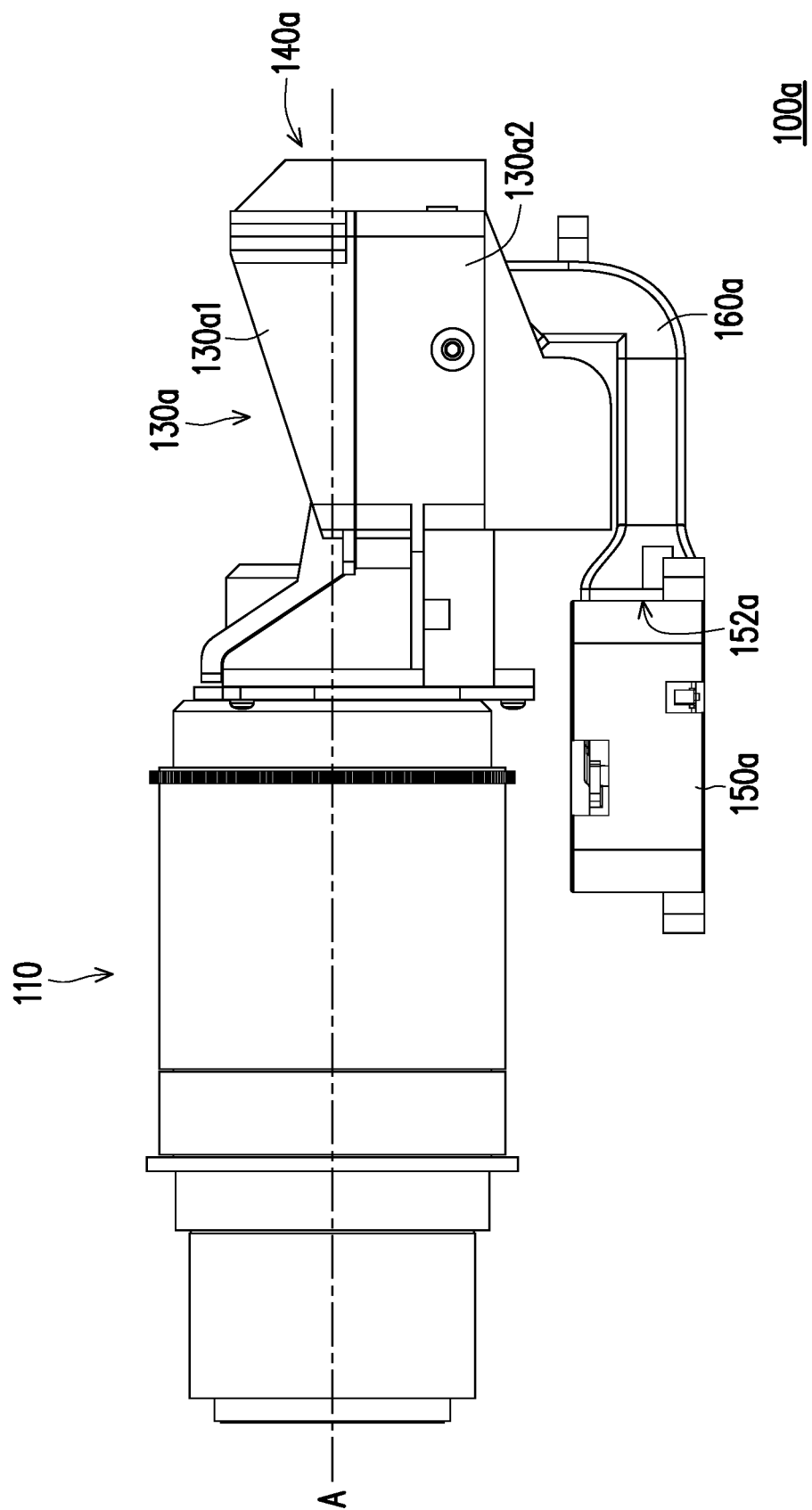
FIG. 1A is a side view of a projection lens module according to an embodiment of the disclosure.
Figure 1B:
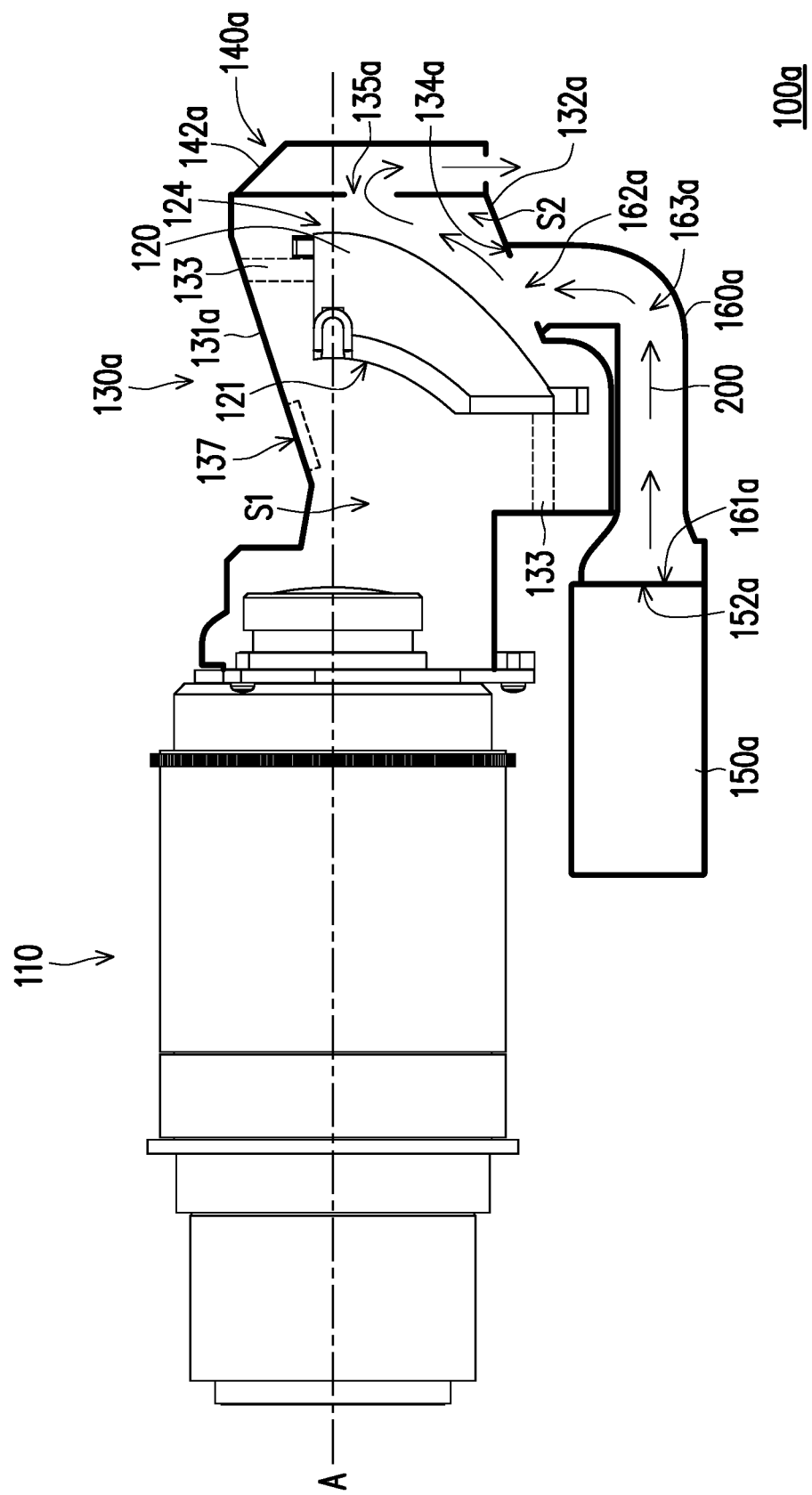
FIG. 1B is a schematic view of air flow in an air guiding element and an air guiding space of the projection lens module of FIG. 1A.
Figure 1C:
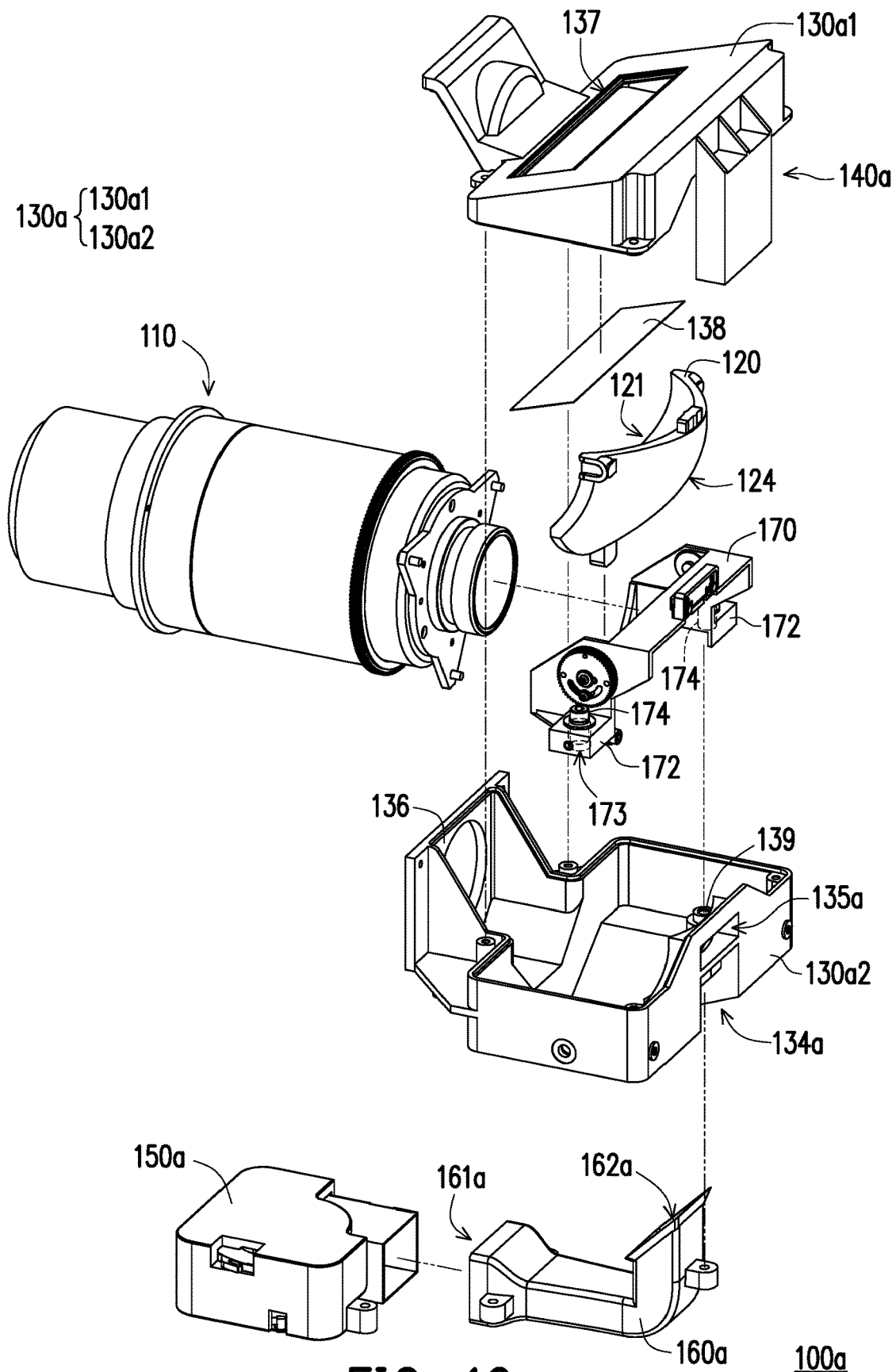
FIG. 1C is an exploded view of the projection lens module of FIG. 1A.

FIG. 1A is a side view of a projection lens module according to an embodiment of the disclosure. FIG. 1B is a schematic view of air flow in an air guiding element and an air guiding space of the projection lens module of FIG. 1A. FIG. 1C is an exploded view of the projection lens module of FIG. 1A. In order to clearly show components of a projection lens module 100a and flow of air 200, a housing 130a and an air guiding element 160a of FIG. 1B are presented in a perspective manner, and some components are omitted and simplified.

Referring to FIGS. 1A to 1C together, the projection lens module 100a of the embodiment includes a lens assembly 110, a reflector 120 (FIG. 1B), the housing 130a, a fan 150a, and the air guiding element 160a. The lens assembly 110 has an optical axis A. The housing 130a includes a first housing 130a1 and a second housing 130a2, and the housing 130a covers a front end of the lens assembly 110 (FIG. 1B). As shown in FIG. 1B, the housing 130a further covers the reflector 120 to fix the reflector 120 in the front of the lens assembly 110, and more specifically, the reflector 120 is disposed on the optical axis A of the lens assembly 110. In particular, the housing 130a is designed to be a combination of the first housing 130a1 and the second housing 130a2 in order to achieve the function of covering the front end of the lens assembly 110 and the reflector 120, and a junction of the first housing 130a1 and the second housing 130a2 may achieve a substantially matching effect. However, the disclosure does not particularly limit distinguishing positions of the first housing 130a1 and the second housing 130a2.

The fan 150a is disposed outside the housing 130a, for example, below the lens assembly 110, and an air outlet of the fan 150a of the embodiment is disposed on a side surface 152a of the fan 150a. The fan 150a of the embodiment is, for example, a centrifugal fan, but the disclosure is not limited thereto. At least one flow channel 163a (FIG. 1B) is formed in the air guiding element 160a. The flow channel 163a communicates with the fan 150a and the housing 130a, so that wind blown by the fan 150a enters the housing 130a through the air guiding element 160a. As shown in FIG. 1B, the fan 150a introduces the external air 200 into the flow channel 163a of the air guiding element 160a, and the air 200 is guided into the housing 130a by the flow channel 163a.

The reflector 120 of the embodiment is, for example, a concave reflector, but the disclosure is not limited thereto. The reflector 120 includes a reflective surface 121 and a shady surface 124 opposite to each other, and the reflective surface 121 is adapted to reflect a light beam (not shown) transmitted by the lens assembly 110. In the embodiment, the reflective surface 121 of the reflector 120, for example, has a coating film to reflect the light beam from the lens assembly 110. The light beam is propagated between the lens assembly 110 and the reflective surface 121 of the reflector 120, and the light beam is reflected by the reflective surface 121 and passes through a light transmitting element 138 (FIG. 1C) to exit the projection lens module 100.

Further, if there is dust or particles falling between the lens assembly 110 and the reflective surface 121, propagation of the light beam is affected, and image quality of the projection lens module 100a is affected. Therefore, the housing 130a of the embodiment may be divided into a first part 131a and a second part 132a. The first part 131a and the reflective surface 121 jointly define an enclosed space S1 (for example, the housing 130a is directly connected to the reflector 120), and the second part 132a and at least a part of the shady surface 124 jointly define an air guiding space S2.

The light beam is propagated in the enclosed space S1, the air guiding space S2 communicates with the air guiding element 160a, and the air 200 flows in the air guiding space S2 to exchange heat with the reflector 120. The enclosed space S1 and the air guiding space S2 do not affect each other.

The enclosed space S1 of the embodiment is a dust-tight space. In other words, the dust or the particles do not fall between the lens assembly 110 and the reflective surface 121 to ensure that the light beam is not affected by the external dust or the air 200 in the air guiding space S2 during propagation.

However, the disclosure is not limited to the embodiment. For example, in other embodiments, the first part 131a, the reflective surface 121, and another part of the shady surface 124 jointly define the enclosed space S1. In addition, the projection lens module 100a of this embodiment may further optionally include at least one airtight element 133. The airtight element 133 is, for example, disposed between the housing 130a and the reflector 120, so that the housing 130a and the reflective surface 121 jointly define the enclosed space S1. In other embodiments, through gluing, the enclosed space S1 and the air guiding space S2 may be formed between the reflector 120 and the housing 130a.

It should be noted that the first part 131a and the second part 132a of the embodiment are not the first housing 130a1 and the second housing 130a2 (FIG. 1A) of the housing 130a, but the part of the housing 130a (including the first housing 130a1 and the second housing 130a2) and the reflector 120 used for defining the enclosed space S1 and the part used for defining the air guiding space S2.

For example, the first part 131a includes a part of the first housing 130a1 and a part of the second housing 130a2 (FIG. 1A), and the second part 132a includes a part of the first housing 130a1 and part of the second housing 130a2. The housing 130a of the embodiment is formed by an opaque material to avoid light leakage of the reflector 120 from affecting the image quality of the projection lens module 100.

As shown in FIG. 1B and FIG. 1C, the first part 131a of the housing 130a of the embodiment includes an opening 137, and the opening 137 is, for example, configured on the first housing 130a1 (FIG. 1C). The light transmitting element 138 (FIG. 1C) is disposed at the opening 137, for example, the light transmitting element 138 covers the opening 137 and makes the same airtight. The light beam reflected by the reflective surface 121 passes through the opening 137 and the light transmitting element 138 to leave the projection lens module 100a.

The second part 132a of the housing 130a includes an air inlet 134a and an air outlet 135a. As shown in FIG. 1C, the air inlet 134a and the air outlet 135a of the second part 132a are configured on the second housing 130a2, but the invention is not limited thereto. The air guiding element 160a includes a first port 161a and a second port 162a. The first port 161a is connected to the fan 150a, and the second port 162a is connected to or extends into the air inlet 134a of the housing 130a. The air 200 flows into the air guiding space S2 from the air inlet 134a, and leaves the air guiding space S2 from the air outlet 135a.

The position of the opening 137 of the first part 131a of the housing 130a is not limited to the embodiment. The positions of the air inlet 134a and the air outlet 135a of the second part 132a of the housing 130a are not limited to the embodiment. For example, in other embodiments, the air outlet 135a may be disposed on the first housing 130a1.

When the light beam is incident to the reflective surface 121 of the reflector 120, the energy of the light beam increases a temperature of the reflective surface 121 and the shady surface 124 of the reflector 120. Since the light beam is not uniformly incident to the reflector 120, but is more concentrated on a partial region of the reflector 120, this region absorbs more energy. In other words, the temperature on the reflective surface 121 and the shady surface 124 of the reflector 120 is not uniformly distributed.

Deformation on the reflective surface 121 and the shady surface 124 caused by the uneven temperature distribution may affect the image quality of the projection lens module 100a. Therefore, the projection lens module 100a of the embodiment guides the wind blown by the fan 150a to at least a part of the shady surface 124 through the fan 150a and the air guide 160a, and the wind exits through the air outlet 135a to cool down the reflector 120 to reduce a temperature difference between different regions of the reflective surface 121 and the shady surface 124.

Figure 1D:
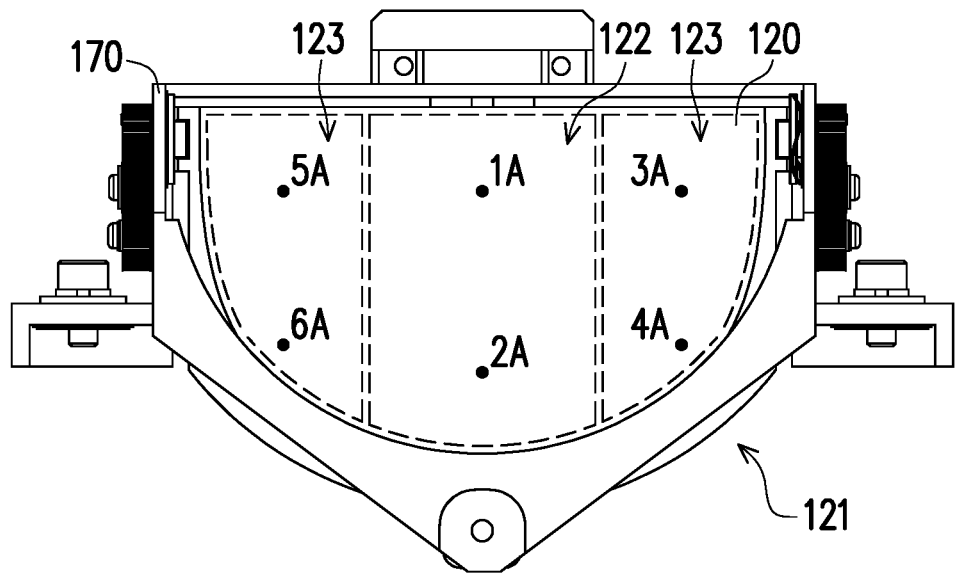
FIG. 1D is a schematic view of a reflective surface of a reflector according to an embodiment of the disclosure.
Figure 1E:
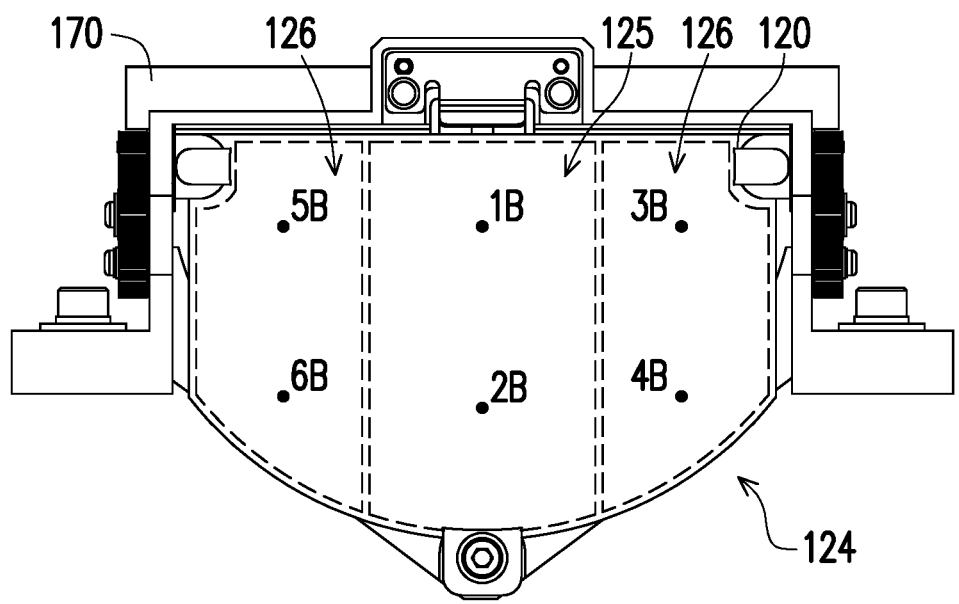
FIG. 1E is a schematic view of a shady surface of the reflector of FIG. 1D.

FIG. 1D is a schematic diagram of a reflective surface of a reflector according to an embodiment of the invention. FIG. 1E is a schematic diagram of a shady surface of the reflector of FIG. 1D. Referring to FIG. 1D and FIG. 1E at the same time, on the reflective surface 121 (FIG. 1D), a region with relatively concentrated light beam incidence is a concentrated incidence region 122, and the rest is a peripheral incidence region 123. A region corresponding to the concentrated incidence region 122 on the shady surface 124 (FIG. 1E) is a central region 125, and the rest is a peripheral region 126. A range of each region on the reflective surface 121 and the shady surface 124 is indicated by dotted lines. The optical axis A (FIG. 1B) of the lens assembly 110 passes through the concentrated incidence region 122 and the central region 125. Therefore, the temperature of the concentrated incidence region 122 and the central region 125 is relatively high, and the temperature of the peripheral incidence region 123 and the peripheral region 126 is relatively low.

Figure 1F:
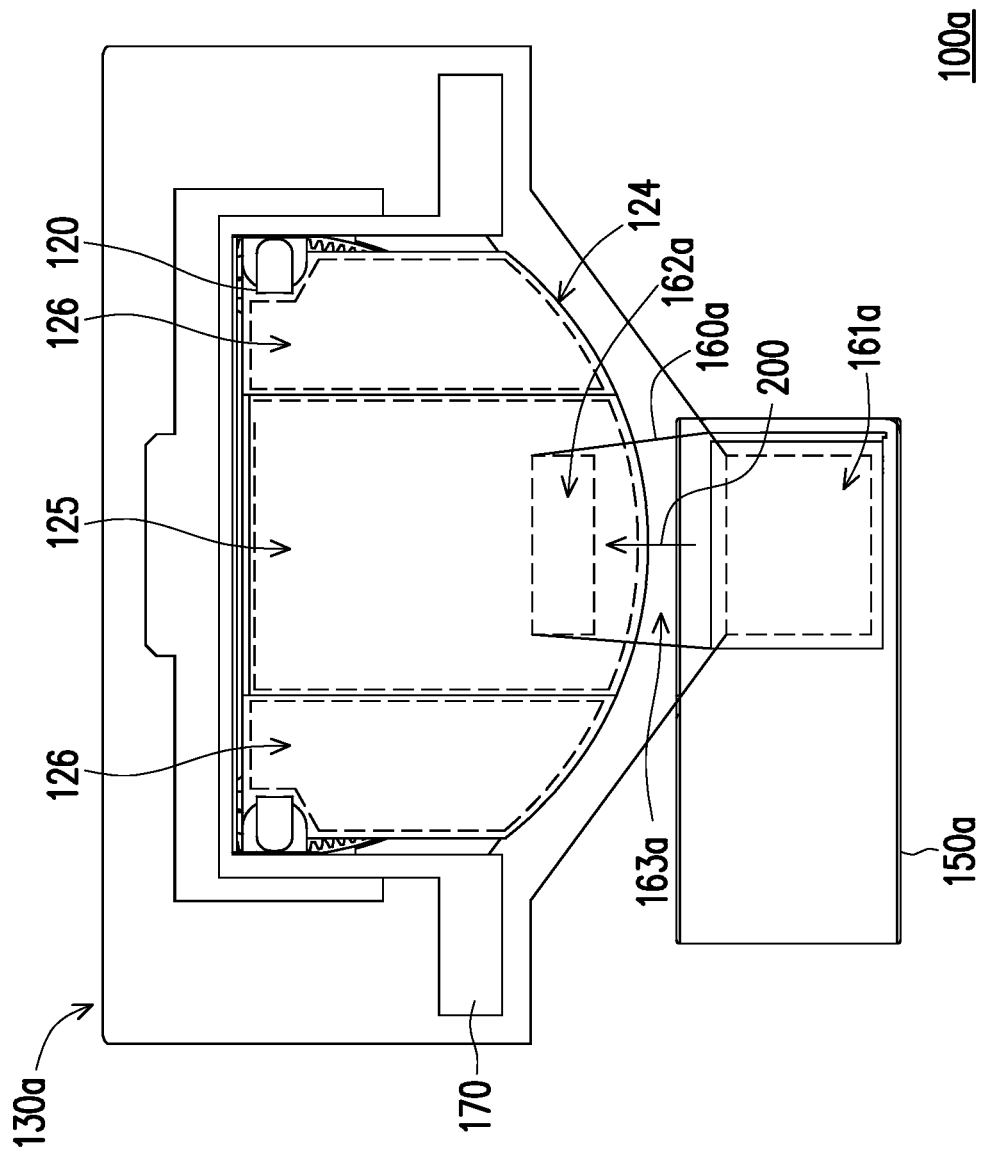
FIG. 1F is a schematic rear view of the projection lens module of FIG. 1C.

FIG. 1F is a schematic rear view of the projection lens module of FIG. 1C. In order to clearly show the flow of the air 200 and an alignment relationship between the air guiding element 160a and the shady surface 124 of the reflector 120, the housing 130a and the air guiding element 160a in FIG. 1F are shown in a perspective manner, and some components are simplified and omitted. In the following description, FIG. 1F is taken as an example to describe the alignment relationship between the air guiding element 160a and the backlight surface 124.

Referring to FIG. 1F, the second port 162a of the air guiding element 160a is aligned with a lower edge of the central region 125 of the shady surface 124, so that the air 200 is guided to the central region 125 in an arrow direction, but the invention is not limited thereto. The second port 162a here does not completely cover the central region 125, but is partially overlapped with the central region 125, but the invention is not limited thereto. For example, in other embodiments, the second port 162a may also be not overlapped with the central region 125.

In addition, as shown in FIG. 1A, FIG. 1C and FIG. 1F, the housing 130a of the embodiment partially surrounds the second port 162a of the air guiding element 160a, so that a junction between the second port 162a and the air inlet 134a is not directly exposed, but the invention is not limited thereto.

Moreover, as shown in FIG. 1F, a size of the second port 162a of the air guiding element 160a in the embodiment is smaller than or equal to a size of the first port 161a. The sizes of the first port 161a and the second port 162a here refer to cross-sectional areas of the air guiding element 160a perpendicular to the extending direction.

An influence of the size difference between the first port 161a and the second port 162a on a flow rate and a convection coefficient of the air 200 will be described in detail below.

A relationship between a flow velocity, a flow rate and a cross-sectional area of the air 200 is shown in a following equation (1). Where, $Q_v$ is the flow rate, V is the flow velocity, and A is the cross-sectional area:

$$Q_v = VA \quad (1)$$

The flow rate Q here is a flow rate of an airflow of the air 200 formed by the fan 150a, the flow velocity V is a flow velocity of the air 200 at the first port 161a or the second port 162a, and the cross-sectional area A is positively correlated with the size of the first port 161a or the second port 162a. The flow rate Q here is a constant value, so that it is known from the equation (1) that the flow velocity V of the air 200 is inversely proportional to the cross-sectional area A. In other words, the smaller the cross-sectional area A is, the larger the flow velocity V is.

A relationship between a convection coefficient of the air 200, a temperature difference of the region to be cooled, and a surface area is shown in a following equation (2). Where, $Q_T$ is a heat amount, h is the convection coefficient, A is a heat dissipation surface area, and $\Delta T$ is the temperature difference.

$$Q_T = hA\Delta T \quad (2)$$

The heat amount $Q_T$ here is a heat amount of the region to be cooled (for example, the central region 125), the heat dissipation surface area A is a surface area of the region to be cooled, the convection coefficient h is positively correlated with convection capability of the air 200, and the temperature difference $\Delta T$ is a temperature difference between a solid surface (for example, the reflective surface 121) and the surrounding. When the heat amount QT and the heat dissipation surface area A are constant values, the temperature difference $\Delta T$ is negatively correlated with the convection coefficient h. In other words, in order to reduce the temperature difference $\Delta T$, the convection coefficient h needs to be increased.

A relationship between the flow velocity V of the equation (1) and the convection coefficient h of the equation (2) is shown in a following equation (3).

$$h \propto V^{0.8} \quad (3)$$

It may be known from the equation (3) that the flow velocity V of the air 200 at the first port 161a or the second port 162a is positively correlated with the convection coefficient h. Therefore, it may be seen from the equations (2) and (3) that the larger the flow velocity V is, the higher the convection coefficient h is, the lower the temperature difference $\Delta T$ is, and the better the heat dissipation effect is. Therefore, according to the equation (1), when the size of the second port 162a is smaller than or equal to the size of the first port 171a, the flow velocity V of the air 200 at the second port 162a may be increased to improve the heat dissipation efficiency of the air 200.

Although the advantage that the size of the first port 161a is larger than the size of the second port 162a (FIG. 1F) has been shown in the equations (1) to (3), a user may make a change according to an actual need, and the size of the first port 161a may be equal to the size of the second port 162a.

Referring back to FIG. 1D and FIG. 1E, six points 1A-6A are taken from the concentrated incidence region 122 and peripheral incidence regions 123 of the reflective surface 121 (FIG. 1D), and six points 1B-6B are taken from the central region 125 and the peripheral region 126 of the shady surface 124 (FIG. 1E). Points 1A, 2A are located in the concentrated incidence region 122 and points 1B, 2B are located in the central region 125.

When the fan 150a is turned off (FIG. 1B) and the fan 150a is turned on, the projection lens module 100a is operated, and temperatures measured at the six points 1A-6A (FIG. D) of the reflective surface 121 and the six points 1B-6B (FIG. 1E) of the shady surface 124 are recorded respectively. The measurement results of the temperatures at the points 1A-6A and 1B-6B of the projection lens module 100a with the fan 150a turned off and the fan 150a turned on are shown in Table 1 below.

TABLE 1

| | | Ambient temperature | |
| --- | --- | --- | --- |
| | | 25 degrees | |
| | | Fan | |
| | Position | Turned off Temperature (degree C) | Turned on Temperature (degree C) |
| Reflective surface | Point 1A | 44 | 33 |
| | Point 2A | 31 | 30 |
| | Point 3A | 37 | 31 |
| | Point 4A | 32 | 29 |
| | Point 5A | 31 | 30 |
| | Point 6A | 30 | 29 |
| | Maximum difference | 14 | 4 |
| Shady surface | Point 1B | 37 | 29 |
| | Point 2B | 36 | 29 |
| | Point 3B | 34 | 29 |
| | Point 4B | 31 | 28 |
| | Point 5B | 38 | 29 |
| | Point 6B | 38 | 28 |
| | Maximum difference | 7 | 1 |

The maximum difference in Table 1 is a difference between the highest temperature and the lowest temperature of the points 1A-6A (FIG. 1D) and the points 1B-6B (FIG. 1E). For example, the maximum difference of the reflective surface 121 of the projection lens module 100a with the fan 150a turned off is a difference between the point 1A and the point 6A (14 degrees C.), and the maximum difference of the shady surface 124 is a difference between the point 5B and the point 4B (7 degrees C.). The maximum difference of the reflective surface 121 of the projection lens module 100a with the fan 150a turned on is a difference between the point 1A and the point 6A (4 degrees C.), and the maximum difference of the shady surface 124 is the difference between the point 5B and the point 4B (1 degree C.).

Therefore, the maximum difference between the points 1A-6A of the projection lens module 100a with the fan 150a turned on is smaller than the maximum difference between the points 1A-6A of the projection lens module with the fan 150a turned off, and the maximum difference between the points 1B-6B of the projection lens module 100a with the fan 150a turned on is smaller than the maximum difference of the points 1B-6B of the projection lens module 100a with the fan 150a turned off. In other words, a temperature distribution of the reflective surface 121 and the shady surface 124 of the reflector 120 of the projection lens module 100a with the fan 150a turned on is relatively uniform.

Referring to table 1 to compare the temperature differences between the points 1A and 2A (FIG. 1D) of the concentrated incidence region 122 and the points 1B and 2B (FIG. 1E) of the central region 125 of the projection lens module 100A with the fan 150A turned off and the projection lens module 100A with the fan 150A turned on, as shown in table 1, the temperature difference at the point 1A of the concentrated incidence region 122 reaches 11 degrees, the temperature difference at the point 1B reaches 8 degrees, and the temperature difference at the point 1B of the central area 125 reaches 8 degrees, and the temperature difference at the point 2B reaches 7 degrees. In other words, the temperatures of the reflective surface 121 and the shady surface 124 of the projection lens module 100a with the fan 150a turned on are lower.

Therefore, the projection lens module 100 with the fan 150a turned on may reduce the temperatures of the concentrated incidence region 122, the peripheral incidence regions 123, the central region 125 and the peripheral regions 125, and further reduce the temperature differences between the concentrated incidence region 122 and the peripheral incidence regions 123, and between the central region 125 and the peripheral regions 125, so that the temperature of the reflector 120 is uniformly distributed, so as to reduce the temperature of the reflector 120 and the influence of the temperature differences between the concentrated incidence region 122 and the peripheral incidence regions 123, and between the central region 125 and the peripheral regions 125 on the image quality of the projection lens module 100a.

Referring back to FIG. 1B, since the housing 130a is configured with the air inlet 134a and the air outlet 135a, in order to prevent light from directly leaving the projection lens module 100a from the air outlet 135a to affect the user's perception, the projection lens module 100a of the embodiment further includes a light shading structure 140a. The light shading structure 140a is suitable for shading light leakage of light beams at any angle.

As shown in FIG. 1B, the light shading structure 140a extends from the housing 130a and is located beside the air outlet 135a, and overlaps the air outlet 135a of the housing 130a in a direction of the optical axis A, so that the light beam is not directly emitted to the outside from the air outlet 138a.

The light shading structure 140a of the embodiment includes a bending cover 142a (FIG. 1B) covering the air outlet 135a and spaced apart from the air outlet 135a, but the invention is not limited thereto. In the embodiment, the light shading structure 140a and the first housing 130a1 are integrally formed, but the invention is not limited thereto. In other embodiments, the light shading structure 140a and the housing 130a are separate components. The air guiding element 160a of the embodiment is made of an opaque material.

Referring to FIG. 1C, the projection lens module 100a of the embodiment further includes a reflector holder 170. The reflector holder 170 is suitable for holding the reflector 120, and the reflector holder 170 is fixed to the second housing 130a2. The reflector holder 170 includes two protruding portions 172 disposed opposite each other, each protruding portion 172 is configured with a connecting hole 173 and a connecting member 174, and the second housing 130a2 includes a protrusion 139 corresponding to the connecting hole 173. The protruding portion 172 is fixed to the protrusion 139 through the connecting hole 173 and the connecting member 174, so as to fix the reflector holder 170 on the second housing 130a2.

The second housing 130a2 of the embodiment further includes a lens barrel fixing base 136. The lens barrel fixing base 136 is sleeved on the lens assembly 110 to fix the second housing 130a2 on the lens assembly 110, so that the lens assembly 110 and the reflector 120 are not moved relative to each other.

Therefore, the light beam of the projection lens module 100a of the embodiment is avoided to be interfered by external dust by using the enclosed space S1 (FIG. 1B) formed by the first part 131a of the housing 130a and the reflector 120. The temperature differences of the concentrated incidence region 122 and the central region 125 (FIG. 1D) with the peripheral incidence regions 123 and the peripheral regions 125 (FIG. 1E) may be reduced through the air guiding space S2 formed by the second part 132a of the body 130a and the reflector 120, the fan 150a and the air guiding element 160a (FIG. 1B). Moreover, the light leakage of the reflector 120 is shielded through the housing 130a with an opaque material, the air guiding element 160a and the light shading structure 140a (FIG. 1B). Therefore, the projection lens module 100a of the embodiment has the functions of dustproof, heat dissipation and light leakage prevention, which improves the image quality of the projection lens module 100a.

The projection lens module 100a of the embodiment is suitable for a projector (not shown). The projector further includes an illumination module and an optical engine module (a light valve). The projection lens module 100a is adapted to transmit a light beam (for example, an image light beam) generated by the optical engine module out of the projector.

Various embodiments are provided below to describe other configurations of the fan 150a, the air guiding element 160a, and the light shading structure 140a. It should be noticed that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 2:
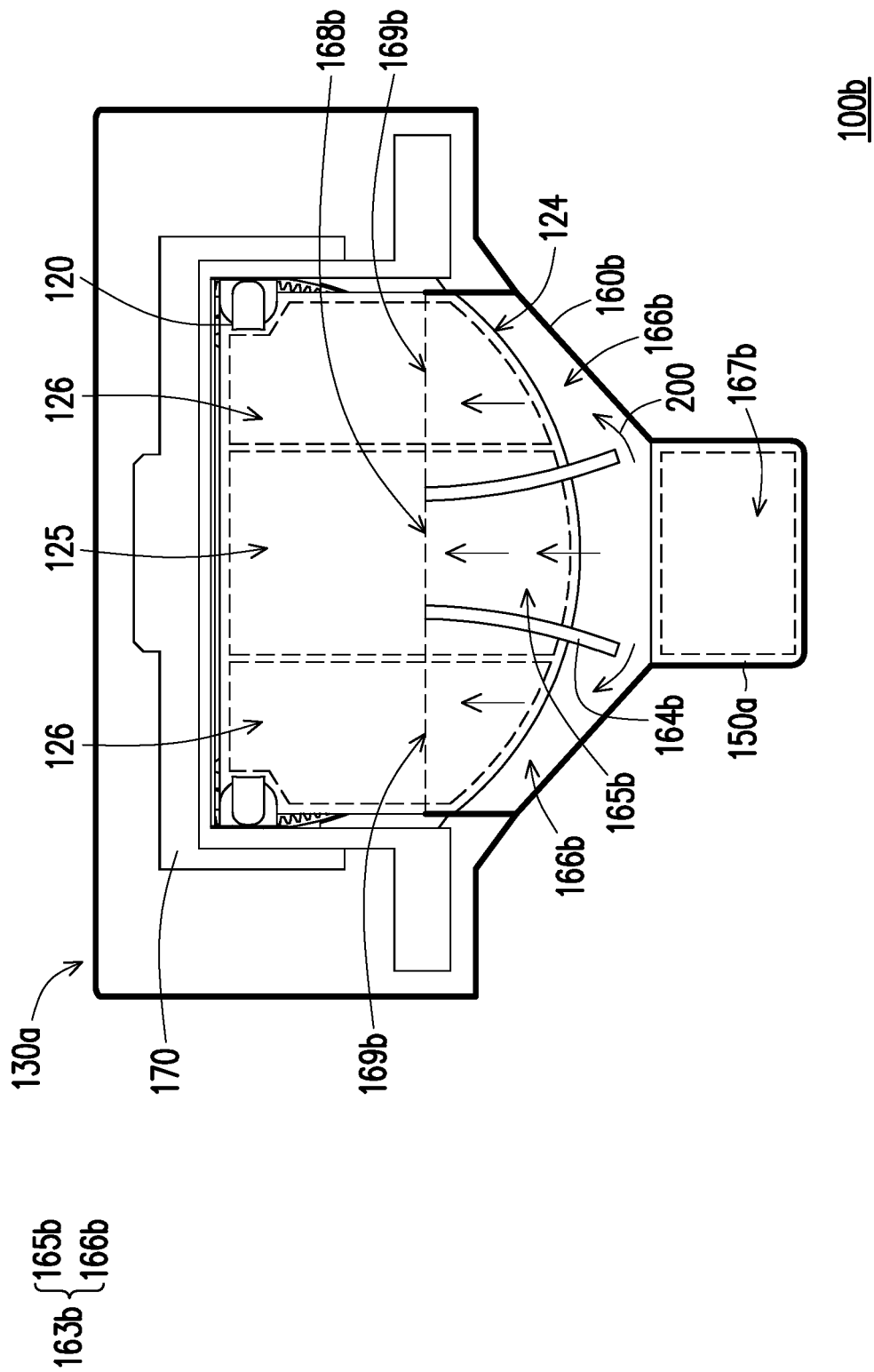
FIG. 2 is a schematic rear view of a projection lens module according to another embodiment of the disclosure.

FIG. 2 is a schematic rear view of a projection lens module according to another embodiment of the invention. Referring to FIG. 1F and FIG. 2 at the same time, a projection lens module 100b of the embodiment is similar to the projection lens module 100a of the above-mentioned embodiment, a difference there between is that an air guiding element 160b of the embodiment further includes at least one inner partition plate 164b. A flow channel 163b of the air guiding element 160b includes a main flow channel 165b and at least one branch flow channel 166b.

As shown in FIG. 2, the flow channel 163b is divided into the main flow channel 165b and two branch flow channels 166b by two inner partition plates 164b, and the air 200 is suitable for flowing in the main flow channel 165b and the branch flow channels 166b. The main flow channel 165b faces the central region 125, and the branch flow channels 166b face the peripheral regions 126. Here, the main channel 165b includes a third port 167b and a fourth port 168b. The third port 167b is connected to the fan 150a, the fourth port 168b faces the central region 125, and a size of the fourth port 168b is smaller than or equal to a size of the third port 167b.

The branch channel 166b further includes a fifth port 169b, and fifth port 169b is an opening of the branch channel 166b and faces the peripheral region 126 and at least a part of the central region 125. In other words, the air guiding element 160b of the embodiment mainly guides the air 200 to the central region 125 and guides a part of the air 200 to the peripheral region 126 to assist the heat dissipation of the central region 125 and the peripheral region 126.

Figure 3:
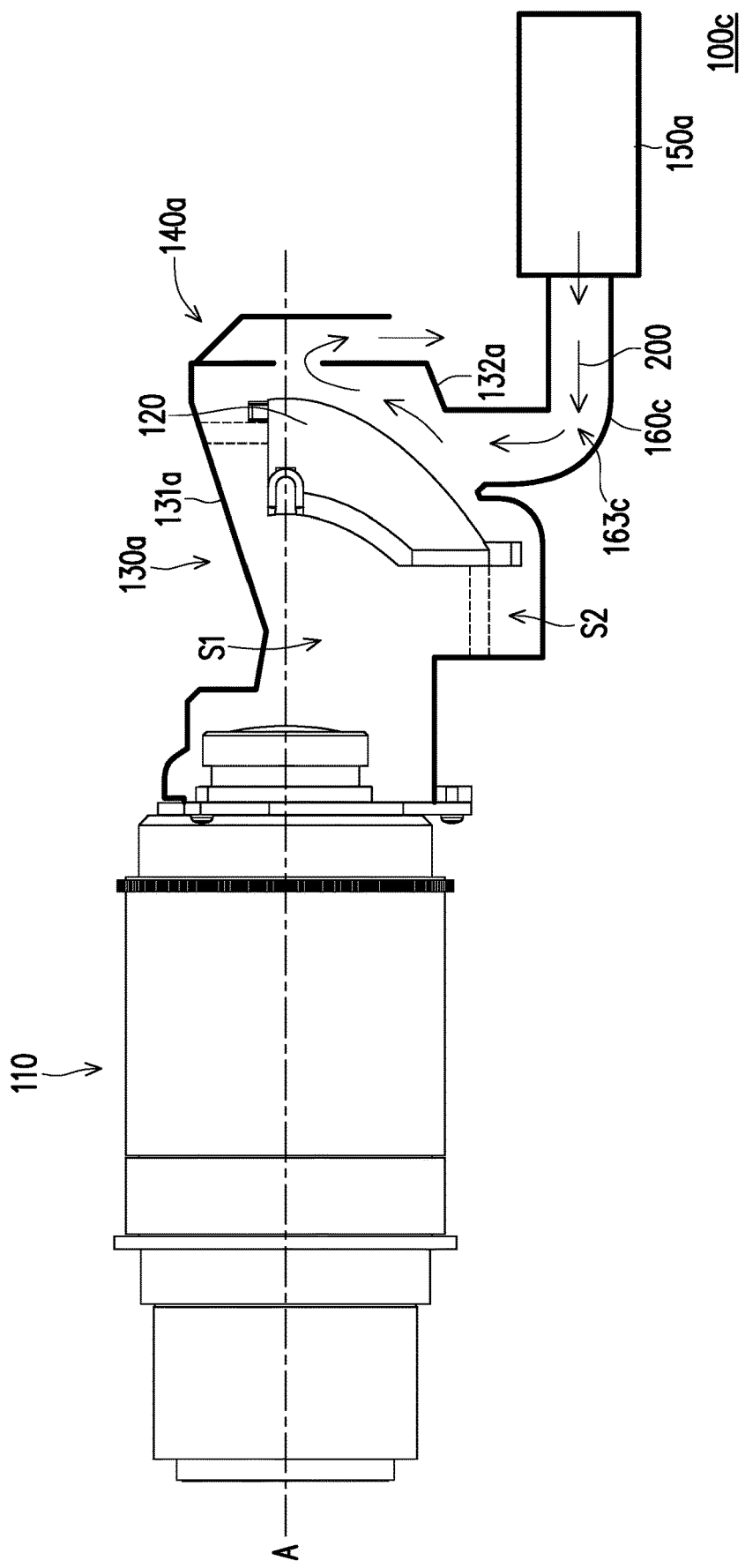
FIG. 3 is a schematic view of air flow in an air guiding element and an air guiding space of a projection lens module according to another embodiment of the disclosure.

FIG. 3 is a schematic diagram illustrating an air flow in an air guiding element and an air guiding space of a projection lens module according to another embodiment of the invention. Referring to FIG. 1B and FIG. 3 at the same time, a projection lens module 100c of the embodiment is similar to the projection lens module 100a of the above-mentioned embodiment, and a difference there between is that the fan 150a is located outside a region directly below the reflector 120 and the lens assembly 110, and is away from the lens assembly 110 in the direction of the optical axis A (a left-right direction in FIG. 3).

As shown in FIG. 3, the fan 150a of the embodiment does not overlap with the reflector 120 or the lens assembly 110 on the optical axis A, and a total length of the air guiding element 160c of the projection lens module 100c of the embodiment in the direction of the optical axis A is smaller than a total length of the air guiding element 160a of the aforementioned projection lens module 100a in the direction of the optical axis A. Therefore, a moving path of the air 200 in the air guiding element 160c is smaller than a moving path of the air 200 in the air guiding element 160a (FIG. 1B), which may further reduce energy loss of the air 200 in the air guiding element 160c. In addition, the change of the position of the fan 150a causes a change of a shape of the air guiding element 160c, but does not affect the functions of dustproof, heat dissipation and light leakage prevention of the projection lens module 100c.

Figure 4A:
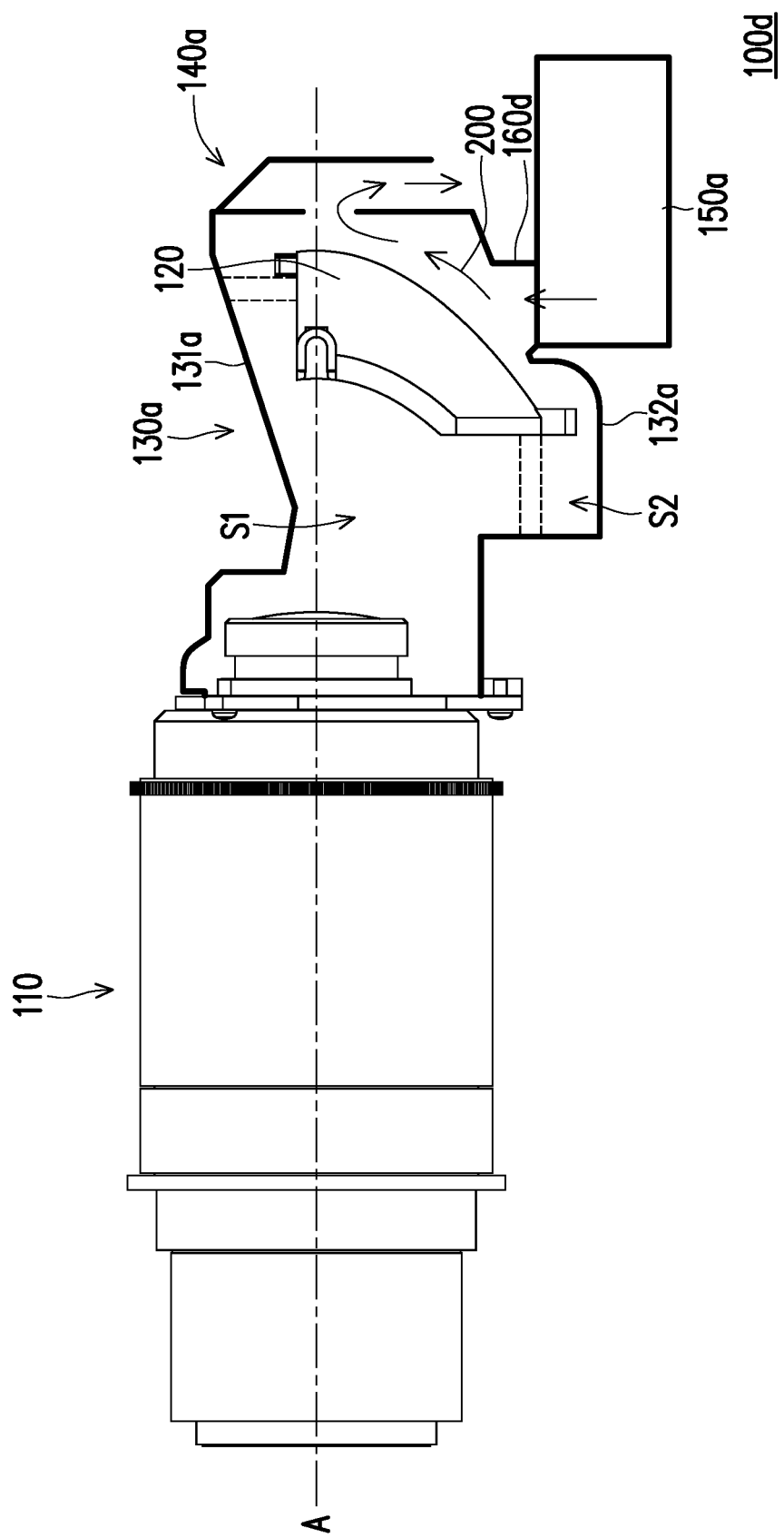
FIG. 4A is a schematic view of air flow in an air guiding element and an air guiding space of a projection lens module according to another embodiment of the disclosure.

FIG. 4A is a schematic diagram illustrating an air flow in an air guiding element and an air guiding space of a projection lens module according to another embodiment of the invention. FIG. 4B is a schematic rear view of the projection lens module of FIG. 4A. Referring to FIG. 4A and FIG. 4B at the same time, a projection lens module 100d of the embodiment is similar to the projection lens module 100c of the above-mentioned embodiment, and a difference there between is that the fan 150a of the embodiment is located outside a region directly below the lens module 110 and the reflector 120. As shown in FIG. 4B, the fan 150a is located on one side of the optical axis A (FIG. 4A), and more specifically, on the left side of the optical axis A and the reflector 120.

As shown in FIG. 4A, the fan 150a of the embodiment is closer to the reflector 120 than the fan 150a of the projection lens module 100c (FIG. 3) in the direction of the optical axis A, so that a total length of the projection lens module 100d of the embodiment along the direction of the optical axis A is smaller than a total length of the projection lens module 100c along the direction of the optical axis A, so as to reduce a size of the projection lens module 100d along the direction of the optical axis A.

Certainly, the users may arrange the fan 150a and the flow channel 163d according to their needs, so as to achieve a better heat dissipation effect without affecting the dustproof and light leakage prevention functions of the projection lens module 100c.

Figure 5:
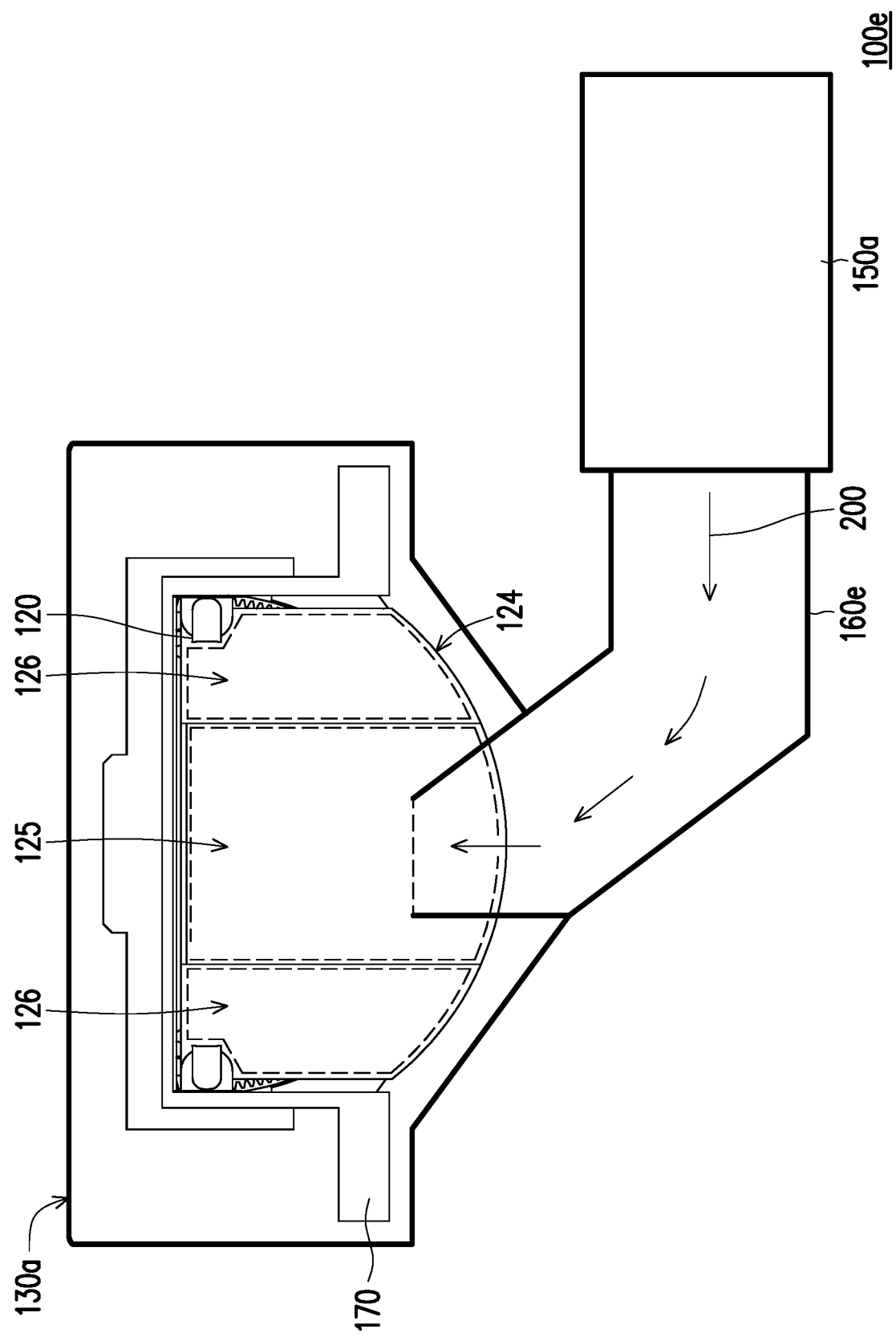
FIG. 5 is a schematic rear view of a projection lens module according to another embodiment of the disclosure.

FIG. 5 is a schematic rear view of a projection lens module according to another embodiment of the invention. The schematic diagram of the flow of the air 200 in the air guiding space S2 of a projection lens module 100e of FIG. 5 is similar to that of FIG. 4A. Referring to FIG. 5, the projection lens module 100e of the embodiment is similar to the projection lens module 100d of the above-mentioned embodiment, and a difference there between is that the fan 150a of the projection lens module 100e of the embodiment is located on the right side of the optical axis A (FIG. 4A) and the reflector 120.

Therefore, the users may arrange the fan 150a on the left side (FIG. 4B) or the right side (FIG. 5) of the optical axis A according to actual needs, and change the shapes of the air guiding elements 160d and 160e accordingly without affecting the dustproof, heat dissipation and light leakage prevention functions of the projection lens modules 100d and 100e.

Figure 6A:
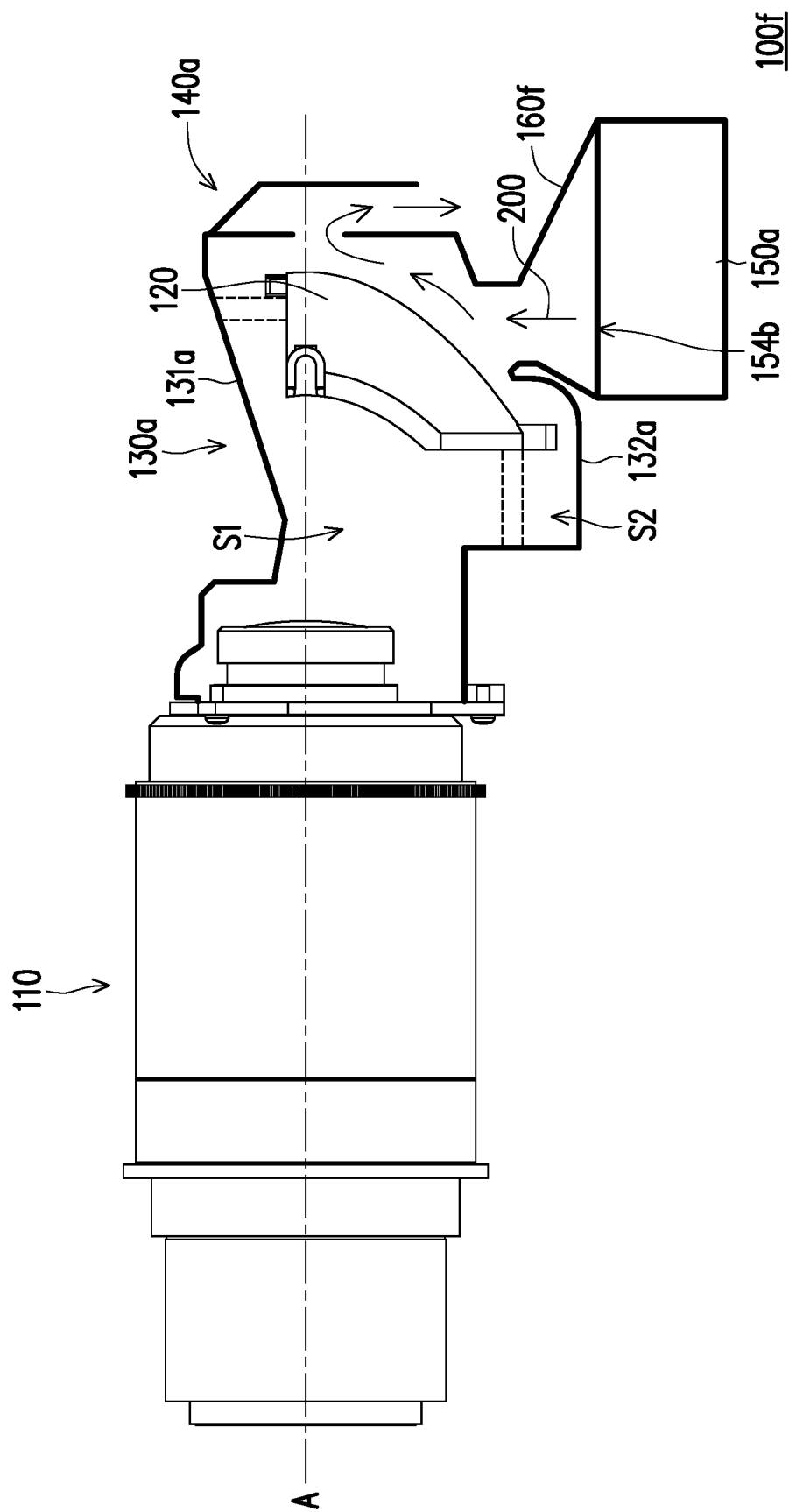
FIG. 6A is a schematic view of air flow in an air guiding element and an air guiding space of a projection lens module according to another embodiment of the disclosure.
Figure 6B:
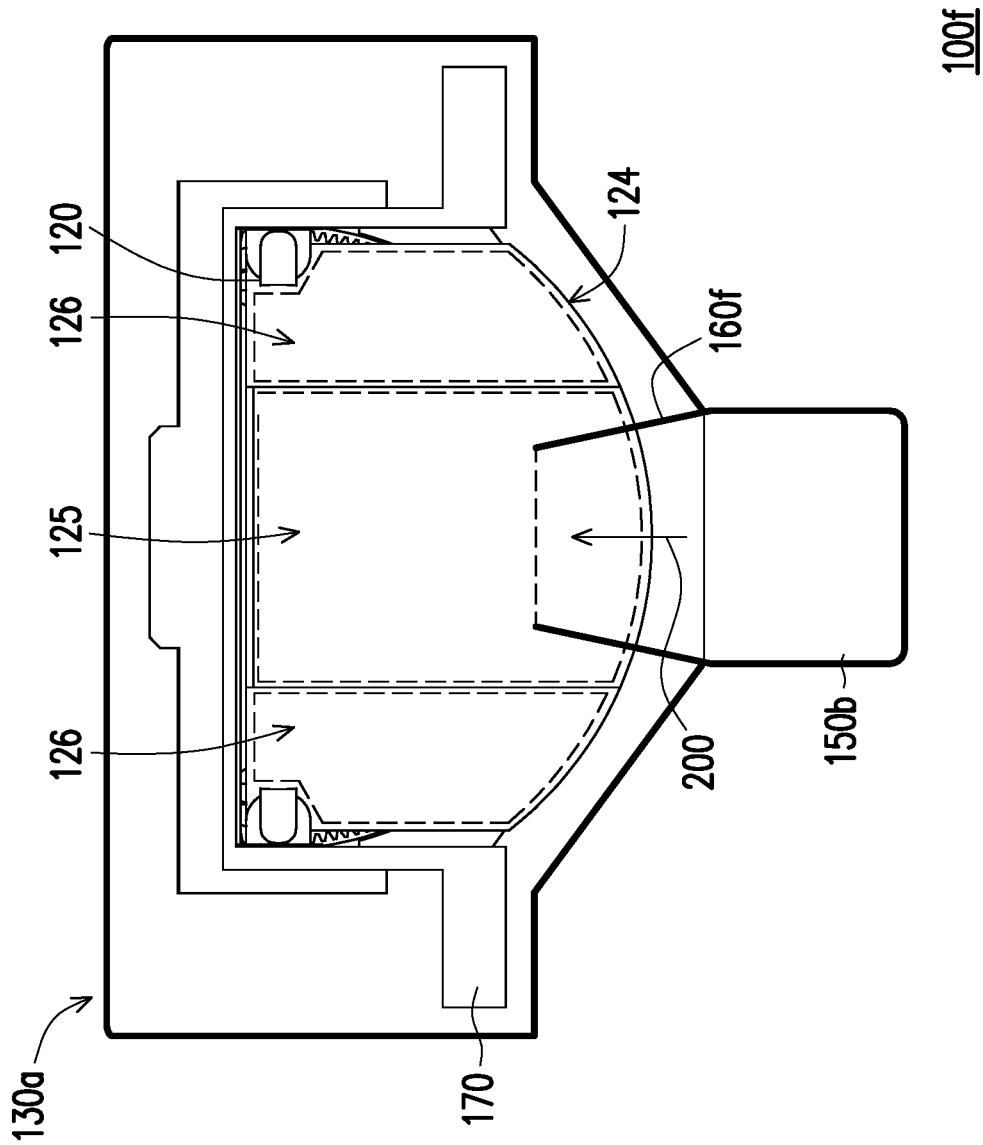
FIG. 6B is a schematic rear view of the projection lens module of FIG. 6A.

FIG. 6A is a schematic diagram illustrating an air flow in an air guiding element and an air guiding space of a projection lens module according to another embodiment of the invention. FIG. 6B is a schematic rear view of the projection lens module of FIG. 6A. Referring to FIG. 6A and FIG. 6B at the same time, a projection lens module 100f of the embodiment is similar to the projection lens module 100d of the above-mentioned embodiment, and a difference there between is that a fan 150b of the embodiment is, for example, an axial flow fan. In other words, an air outlet of the fan 150b is arranged on a front surface 154b of the fan 150b.

As shown in FIG. 6B, the fan 150b is disposed below the reflector 120 and is partially overlapped with the reflector 120, so that a length of an air guiding element 160f is smaller than that of the air guiding element 160d (FIG. 4B) of the above embodiment. In other words, the embodiment may further reduce a volume of the projection lens module 100f in the direction of the optical axis A and a direction perpendicular to the optical axis A, and shorten the moving path of the air 200 in the air guiding element 160f, without affecting the dustproof, heat dissipation and light leakage prevention functions of the projection lens modules 100d and 100e.

Figure 7:
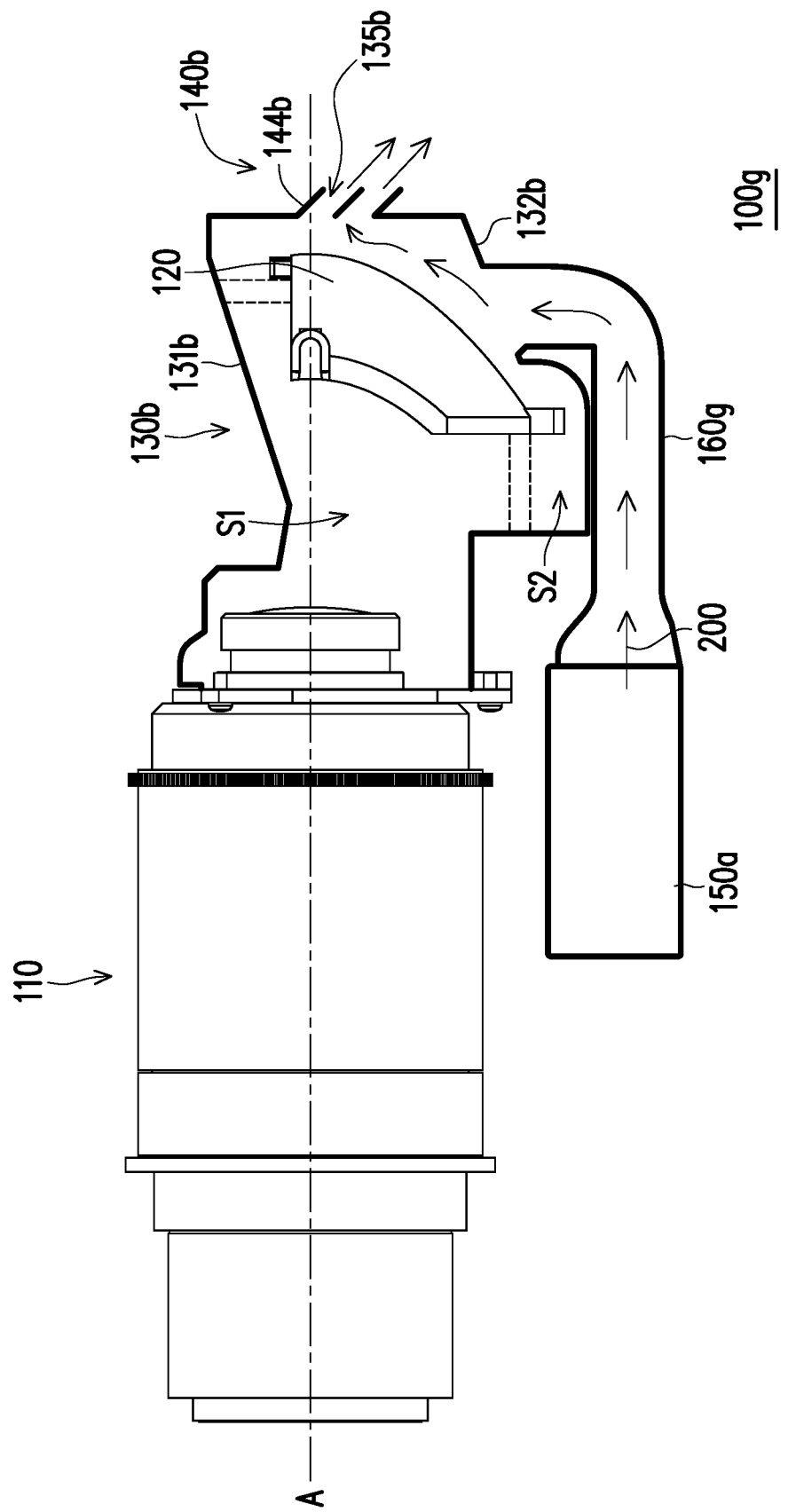
FIG. 7 is a schematic view of air flow in an air guiding element and an air guiding space of a projection lens module according to another embodiment of the disclosure.

FIG. 7 is a schematic diagram illustrating an air flow in an air guiding element and an air guiding space of a projection lens module according to another embodiment of the invention. Referring to FIG. 7, a projection lens module 100g of the embodiment is similar to the projection lens module 100a of the above-mentioned embodiment, and a difference there between is that a light shading structure 140b of the embodiment includes a plurality of plates 144b arranged obliquely with respect to the optical axis A (for example, inclined downward), and allows the air 200 to flow, for example, substantially in a direction opposite to a direction along which the light beam is transmitted out of the light transmitting element 138.

The plate 144b is disposed on the housing 130b and a gap between the plate 144b and the housing 130b may be used as an air outlet 135b of a second part 132b of the housing 130b. Therefore, the light shading structure 140b of the embodiment has the same effect as that of the light shading structure 140a of the above-mentioned embodiment. The user may select a suitable light shading structure 140b according to an actual need without affecting the light leakage prevention function of the projection lens module 100g.

In summary, the projection lens module of the invention uses the enclosed space formed by the first part of the housing and the reflector to avoid the light beam from being interfered by external dust. The temperature difference between the central region and the peripheral regions of the reflector is reduced by using the air guiding space formed by the second part of the housing and the reflector, the fan and the air guiding element. In addition, the light leakage of the reflector is blocked by using the housing with the opaque material, the air guiding element and the light shading structure, the light shading structure is located beside the air outlet and overlaps the air outlet of the housing in the direction of the optical axis to block light leakage of the reflector at any angle. In this way, the projection lens module of the invention has dustproof, heat dissipation and light leakage prevention functions, which improves the image quality of the projection lens module.

In addition, the fan of the embodiment is selectively arranged below the lens assembly or the reflector, or arranged outside the region directly below the lens assembly and the reflector, such that the user may choose an appropriate arranging method according to an actual need without affecting the dustproof, heat dissipation and light leakage prevention functions of the projection lens module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection lens module, comprising:
a lens assembly, having an optical axis;
a reflector, disposed on the optical axis of the lens assembly to reflect a light beam transmitted by the lens assembly, wherein the reflector comprises a reflective surface and a shady surface opposite to each other;
a housing, covering the reflector, and comprising a first part and a second part, wherein the second part comprises an air inlet and an air outlet, the first part and the reflective surface of the reflector jointly define an enclosed space, and the second part and at least a part of the shady surface of the reflector jointly define an air guiding space;
a light shading structure, extending from the housing and located besides the air outlet, wherein the light shading structure overlaps the air outlet in a direction of the optical axis;
a fan, disposed outside the housing; and
an air guiding element, connected to the fan and the air inlet of the housing, to guide wind blown by the fan to the at least a part of the shady surface to leave from the air outlet.

2. The projection lens module according to claim 1, wherein the air guiding element comprises a first port and a second port, the first port is connected to the fan, the second port is connected to or extends into the air inlet of the housing, and a size of the second port is smaller than or equal to a size of the first port.

3. The projection lens module according to claim 2, wherein the second port faces a central region of the shady surface, and the optical axis of the lens assembly passes through the central region.

4. The projection lens module according to claim 1, wherein the air guiding element comprises at least one inner partition plate to divide an inside of the air guiding element into a main flow channel and at least one branch flow channel, the main flow channel faces a central region of the shady surface, the at least one branch flow channel faces at least one peripheral region of the shady surface, and the optical axis of the lens assembly passes through the central region.

5. The projection lens module according to claim 4, wherein the main flow channel comprises a third port and a fourth port opposite to each other, the third port is connected to the fan, the fourth port faces the central region of the shady surface, and a size of the fourth port is smaller than or equal to a size of the third port.

6. The projection lens module according to claim 1, wherein the light shading structure comprises a bending cover covering on the air outlet and spaced apart from the air outlet.

7. The projection lens module according to claim 1, wherein the light shading structure comprises a plurality of plates disposed obliquely with respect to the optical axis.

8. The projection lens module according to claim 1, wherein the fan is located below the reflector or below the lens assembly.

9. The projection lens module according to claim 1, wherein the fan is located in a region other than directly below the reflector and the lens assembly, and is away from the lens assembly in the direction of the optical axis or is located on a side of the optical axis.

10. The projection lens module according to claim 1, wherein the housing is formed by an opaque material, and the first part of the housing comprises an opening, a light transmitting element is disposed at the opening, and the light beam reflected by the reflector passes through the light transmitting element and is transmitted out of the projection lens module.

* * * * *